USundefined008853386B2

(12) United States Patent
Wang et al.

(10) Patent No.: US 8,853,386 B2
(45) Date of Patent: Oct. 7, 2014

(54) STARCH ESTERS, METHODS OF MAKING SAME, AND ARTICLES MADE THEREFROM

(75) Inventors: Linfu Wang, Blacksburg, VA (US); Henry P. Stogner, Bluefield, WV (US); Billy C. Batson, Pearisburg, VA (US)

(73) Assignee: Celanese Acetate LLC, Dallas, TX (US)

( * ) Notice: Subject to any disclaimer, the term of this patent is extended or adjusted under 35 U.S.C. 154(b) by 748 days.

(21) Appl. No.: 11/611,992

(22) Filed: Dec. 18, 2006

(65) Prior Publication Data

US 2008/0146792 A1  Jun. 19, 2008

(51) Int. Cl.
| | |
|---|---|
| C08B 31/02 | (2006.01) |
| D01F 2/28 | (2006.01) |
| C08F 251/00 | (2006.01) |
| C08L 1/10 | (2006.01) |
| D01F 9/00 | (2006.01) |
| C08B 31/04 | (2006.01) |
| C08F 251/02 | (2006.01) |
| C08L 3/06 | (2006.01) |

(52) U.S. Cl.
CPC .............. *C08F 251/02* (2013.01); *D01F 2/28* (2013.01); *C08F 251/00* (2013.01); *C08L 1/10* (2013.01); *D01F 9/00* (2013.01); *C08B 31/04* (2013.01); *C08L 3/06* (2013.01)
USPC ................................ 536/107; 536/45; 536/48

(58) Field of Classification Search
USPC .................. 536/45, 48, 107; 527/300
See application file for complete search history.

(56) References Cited

U.S. PATENT DOCUMENTS

| | | | | | |
|---|---|---|---|---|---|
| 2,012,344 | A | * | 8/1935 | Levey | 428/533 |
| 2,365,173 | A | * | 12/1944 | Caesar | 536/110 |
| 3,361,585 | A | * | 1/1968 | Armour et al. | 106/207.5 |
| 3,839,320 | A | * | 10/1974 | Bauer | 536/110 |
| 4,011,392 | A | * | 3/1977 | Rudolph et al. | 536/108 |
| 4,314,056 | A | * | 2/1982 | Brewer et al. | 536/63 |
| 4,333,484 | A | * | 6/1982 | Keritsis | 131/359 |
| 4,720,544 | A | * | 1/1988 | Schouten | 536/110 |
| 5,205,863 | A | | 4/1993 | Elion | |
| 5,384,163 | A | * | 1/1995 | Budde et al. | 427/385.5 |
| 5,446,140 | A | | 8/1995 | Maheras et al. | |
| 5,507,304 | A | * | 4/1996 | Maheras et al. | 131/331 |
| 5,608,050 | A | * | 3/1997 | Kuo et al. | 536/69 |
| 5,629,416 | A | * | 5/1997 | Neigel et al. | 536/106 |
| 5,693,279 | A | * | 12/1997 | Feuer et al. | 264/204 |
| 5,792,856 | A | * | 8/1998 | Allen et al. | 536/66 |
| 5,936,014 | A | * | 8/1999 | Voigt et al. | 524/51 |
| 6,605,715 | B1 | | 8/2003 | Lammers et al. | |

OTHER PUBLICATIONS

Hawley's Condensed Chemical Dictionary, 1997, pp. 358-359.*
Hawleys, Condensed Chemical Dictionary, 13th Edn, 1997, pp. 227 and 1044.*
Ciusa, et al, "Acetylation in the Presence of Phosphoric Acid," Institute of Pharmaceutical Chemistry of Benito Mussolini University, (Jan. 11, 1943).

* cited by examiner

*Primary Examiner* — Ganapathy Krishnan

(57) ABSTRACT

Starch esters are made by: reacting a starch with an esterifying agent in the presence of a catalyst in a solvent for the starch ester, the esterifying agent including a mixture of at least two esterifying agents; or pre-treating a starch in a bath being free of an esterifying agent, and reacting the pre-treated starch with an esterifying agent in the presence of a catalyst. Articles are made by blending cellulose ester and starch ester, may be cross-linked, and may include internal plasticizers.

12 Claims, No Drawings

STARCH ESTERS, METHODS OF MAKING SAME, AND ARTICLES MADE THEREFROM

FIELD OF THE INVENTION

Starch esters, methods of making same, and articles made therefrom are discussed herein.

BACKGROUND OF THE INVENTION

Starch esters are disclosed in U.S. Pat. Nos. 6,605,715 and 5,205,863. Highly acetylated starches (e.g. with degree of substitution (D.S.) of 2 to 3) are of interest because of their solvent solubility and thermoplasticity; but, are not commercially produced because they have low strength when compared to cellulose acetate.

Recently, interest in starch acetate has been rising because of its biodegradability. See: U.S. Pat. No. 5,205,863. In this instance, low strength is not a problem.

Commercial starch raw materials generally contain 20-30 wt % of amylose and 70-80 wt % amylopectin. Amylose is essentially a linear polymer with good strength. Amylopectin is a branched polymer which has a higher molecular weight than amylose but, has less strength because of the branching. Moreover, in the esterification of the starch, acids are often used to catalyze the reaction, and the acid causes chain-scission which also reduces strength.

Ciusa, R. & Sollazzo, G., "Acetylation in the Presence of Phosphoric Acid," Institute of Pharmaceutical Chemistry of Benito Mussolini University, Jan. 11, 1943 discloses producing starch acetate by acetylating starch with a phosphoric acid catalyst.

U.S. Pat. No. 5,205,863 discloses a method for producing starch acetate by pre-treating starch with a mixture of acetic acid and acetic anhydride, and acid catalyzing the esterification with a single acetylation agent, acetic anhydride.

U.S. Pat. No. 5,693,279 discloses a method of making starch acetate with a methane sulfonic acid (MSA) catalyst and with MSA and phosphoric acid catalyst.

U.S. Pat. No. 6,605,715 discloses a method for producing starch esters by reacting a starch with an organic carboxylic acid anhydride (e.g. acetic anhydride) in the presence of a catalyst (e.g. sodium acetate, sodium hydroxide, or sulfuric acid) and at an excess pressure.

U.S. Pat. Nos. 5,446,140; 5,507,304; and 5,693,279 disclose blends of cellulose acetate and starch acetate are used to make fibers and plastic materials.

Accordingly, there is a need for improved starch esters having commercial potential (e.g. increased strength), and a method to produce those starch esters.

SUMMARY OF THE INVENTION

Starch esters are made by: reacting a starch with an esterifying agent in the presence of a catalyst in a solvent for the starch ester, the esterifying agent including a mixture of at least two esterifying agents; or pre-treating a starch in a bath being free of an esterifying agent, and reacting the pre-treated starch with an esterifying agent in the presence of a catalyst. Articles are made by blending cellulose ester and starch ester, may be cross-linked, and may include internal plasticizers.

DESCRIPTION OF THE INVENTION

The present invention is directed to starch esters, methods of making same, and fibers made therefrom.

In general, starch esters are made by reacting a starch with an esterifying agent in the presence of a catalyst in a solvent for the starch ester. In one embodiment, the starch ester may be acetone soluble. In one embodiment, the esterifying agent may comprise a mixture of two or more esterifying agents. In another embodiment, the starch may be subjected to a pre-treatment.

Starch, as used herein, may refer to any plant derived starch. Such starch may be derived from corn starch, potato starch, rice starch, wheat starch, tapioca starch, arrachaca starch, buckwheat starch, banana starch, barley starch, cassava starch, kudzu starch, oca starch, sago starch, sorghum starch, sweet potato starch, taro starch, yam starch, fava bean starch, lentil starch, pea starch, and combinations thereof.

Esterifying agent, as used herein, may refer to any organic anhydrides. Exemplary organic anhydrides include, but are not limited to, acetic anhydride, propionic anhydride, butyric anhydride, hexanoic anhydride, maleic anhydride, phthalic anhydride, succinic anhydride, hexenyl succinic anhydride, octenyl succinic anhydride, dodecenylsuccinic anhydride, hexadecenyl succinic anhydride, and mixtures thereof.

In the embodiment where the esterifying agent may comprise a mixture of two or more esterifying agents, one esterifying agent may be a non-cyclic organic anhydride and the other may be a cyclic organic anhydride. Non-cyclic organic anhydrides include, but are not limited to: acetic anhydride, propionic anhydride, butyric anhydride, hexanoic anhydride, and mixtures thereof. Cyclic organic anhydrides include, but are not limited to, maleic anhydride, phthalic anhydride, succinic anhydride, hexenyl succinic anhydride, octenyl succinic anhydride, dodecenyl succinic anhydride, hexadecenyl succinic anhydride, and mixtures thereof. In this embodiment, the non-cyclic organic anhydride comprises a majority of the esterifying agent. In another embodiment, the weight ratio of the total anhydride (non-cyclic and cyclic) to starch may be 2.1-3.6/1.0, where the weight ratio of non-cyclic anhydride to starch may be 1.5-3.0/1.0 and the weight ratio of cyclic anhydride to starch may be up to 0.6/1.0.

Catalyst, as used herein, may include any material, organic or inorganic, that can catalyze the esterification reaction. Such catalyst may be acidic or basic. Such acids may include, but are not limited to, sulfuric acid, perchloric acid, hydrochloric acid, methane sulfonic acid, dodecyl benzene sulfonic acid, benzene sulfonic acid, toluene sulfonic acid, strong-acid ion exchange resin, phosphoric acid, and mixtures thereof. Such basic catalysts include, but are not limited to, sodium hydroxide, sodium acetate, sodium carbonate, sodium bicarbonate, pyridine, and mixtures thereof. In one embodiment, phosphoric acid is used. The amount of catalyst should be sufficient to catalyze the reaction. In one embodiment, the amount of catalyst may compromise up to 20 wt % starch.

Solvent for the starch ester, as used herein, may refer to any solvent for the starch ester. Such solvents may include, but are not limited to, glacial acetic acid, formic acid, propionic acid, butyric acid, dichloromethane, chloroform, and mixtures thereof. The amount of solvent for the starch ester may be greatly in excess of the reactants and catalysts so that the reaction is conducted in a liquid phase.

In the embodiment where the method includes a pre-treatment of the starch, the pre-treatment is conducted in a bath. The bath may be free of any esterifying agents. The bath may include, but is not limited to, water, a solvent for starch ester (see above), and/or combinations thereof. The starch may be pre-treated for a period of time sufficient to allow the starch molecules to swell or open whereby the esterifying agent(s) and catalyst(s) penetrate the starch molecule. In one embodiment, pre-treatment time is about one hour. In another embodiment, pre-treatment time is about ½ an hour. In one embodiment, pre-treatment temperatures range from room temperature to 100° C. In one embodiment, where the bath comprises a mixture of water and a solvent, the solvent is in excess of the water. During pre-treatment, the bath liquid is in excess of the starch.

During the esterification reaction, in one embodiment, temperatures may range from 60-120° C. Reaction times, in one embodiment, may range from ½ hour to 8 hours.

The starch ester may be formed into articles of manufacture or used as a resin for making articles of manufacture. Articles of manufacture include, but are not limited to, resins, fibers, films, sheets, or other shaped objects. In one embodiment, the article is a fiber. In one embodiment, the fiber may be a blend of two or more polymers, where one polymer is a starch ester. In another embodiment, the fiber may be a blend of a starch ester and a cellulose ester. In yet another embodiment, the fiber may be a blend of cellulose acetate and a starch ester. Further, the fiber may include an internal plasticizer. The fiber may also have the polymers therein cross-linked. In one embodiment, the non-starch ester is in excess of the starch ester. In another embodiment, the starch ester comprises 5-50 wt % of the fiber.

Internal plasticizer, as used herein, refers to a material added to a polymer both to facilitate processing and to increase the flexibility and toughness of the final product by internal modification of the polymer molecule. In one embodiment, the internal plasticizer bonds with the polymer. Internal plasticizers may include, but are not limited to, phthalate ester, maleate ester, succinate ester, hexenyl succinate ester, octenyl succinate ester, dodecenylsuccinate ester, hexadecenyl succinate ester. The internal plasticizer may comprise up to 60 wt % of the fiber.

Cross-linking, as used herein, refers to the attachment of two polymer chains by bridges, composed of either an element, a group, or a compound, that join carbon atoms of the polymer chains by chemical bonds. In one embodiment, cross-linking may be accomplished by use of a cross-linking agent. Cross-linking agent, as used herein, is a material used to form the bridges between the polymer chains. Cross-linking agents may include, but are not limited to, diepoxides, polyepoxides, dianhydrides, polyanhydrides, dialdehydes, polyaldehydes, diisocynates, polyisocynates, and mixtures thereof. Polyepoxides may include, but are not limited to, glycerol diglycedyl ether, neopentyl glycol diglycidyl ether, glycerol propoxylate triglycidyl ether, bisphenol A propoxylate diglycidyl ether, bisphenol A diglycidyl ether. Polyaldehydes may include, but are not limited to, glyoxal. The cross-linking agent may comprise up to 10 wt % of the fiber.

In one embodiment, the foregoing fiber may be made by the following procedure: the cellulose ester and starch ester are formed into a spinnable mixture, and the spinnable mixture is spun into a filament. In another embodiment, cellulose acetate and starch ester are dissolved into a suitable solvent to form a dope, and the dope is spun into a filament.

Suitable solvent, as used herein, refers to any solvent capable of dissolving the starch ester and cellulose ester. Suitable solvents include, but are not limited to, acetone, acetone/water mixture, acetic acid, dichloromethane, dichloromethane/methanol mixture, chloroform, and mixtures thereof.

In an alternative embodiment, the present invention is directed to cellulose esters, methods of making same, and fibers made therefrom.

In general, cellulose esters are made by reacting a cellulose with an esterifying agent in the presence of a catalyst in a solvent for the cellulose ester, and optionally, followed by hydrolysis (de-esterification). In one embodiment, the cellulose ester may be acetone soluble. In another embodiment, the esterifying agent may comprise a mixture of two or more esterifying agents.

Cellulose, as used herein, may refer to any plant derived cellulose. Such cellulose may be derived from cotton cellulose, wood cellulose, and combinations thereof.

Esterifying agent, as used herein, may refer to any organic anhydrides. Exemplary organic anhydrides include, but are not limited to, acetic anhydride, propionic anhydride, butyric anhydride, hexanoic anhydride, maleic anhydride, phthalic anhydride, succinic anhydride, hexenyl succinic anhydride, octenyl succinic anhydride, dodecenylsuccinic anhydride, hexadecenyl succinic anhydride, and mixtures thereof.

In the embodiment where the esterifying agent may comprise a mixture of two or more esterifying agents, one esterifying agent may be a non-cyclic organic anhydride and the other may be a cyclic organic anhydride. Non-cyclic organic anhydrides include, but are not limited to: acetic anhydride, propionic anhydride, butyric anhydride, hexanoic anhydride, and mixtures thereof. Cyclic organic anhydrides include, but are not limited to, maleic anhydride, phthalic anhydride, succinic anhydride, hexenyl succinic anhydride, octenyl succinic anhydride, dodecenyl succinic anhydride, hexadecenyl succinic anhydride, and mixtures thereof. In this embodiment, the non-cyclic organic anhydride comprises a majority of the esterifying agent. In another embodiment, the weight ratio of the total anhydride (non-cyclic and cyclic) to cellulose may be 2.1-3.6/1.0, where the weight ratio of non-cyclic anhydride to cellulose may be 1.5-3.0/1.0 and the weight ratio of cyclic anhydride to cellulose may be up to 0.6/1.0.

Catalyst, as used herein, may include any material, organic or inorganic, that can catalyze the esterification reaction. Such catalyst may be acidic or basic. Such acids may include, but are not limited to, sulfuric acid, perchloric acid, hydrochloric acid, methane sulfonic acid, dodecyl benzene sulfonic acid, benzene sulfonic acid, toluene sulfonic acid, strong-acid ion exchange resin, phosphoric acid, and mixtures thereof. Such basic catalysts include, but are not limited to, sodium hydroxide, sodium acetate, sodium carbonate, sodium bicarbonate, pyridine, and mixtures thereof. In one embodiment, phosphoric acid is used. The amount of catalyst should be sufficient to catalyze the reaction. In one embodiment, the amount of catalyst may compromise up to 20 wt % cellulose.

Solvent for the cellulose ester, as used herein, may refer to any solvent for the cellulose ester. Such solvents may include, but are not limited to, glacial acetic acid, formic acid, propionic acid, butyric acid, dichloromethane, chloroform, and mixtures thereof. The amount of solvent for the cellulose ester may be greatly in excess of the reactants and catalysts so that the reaction is conducted in a liquid phase.

During the esterification reaction, in one embodiment, temperatures may range from 35-130° C. Reaction times, in one embodiment, may range from ½-8 hours.

The cellulose ester may be formed into articles of manufacture or used as a resin for making articles of manufacture. Articles of manufacture include, but are not limited to, resins, fibers, films, sheets, or other shaped objects. In one embodiment, the article is a fiber. The cellulose ester polymers of the fiber may be cross-linked. This will increase the physical properties of the fiber.

Cross-linking, as used herein, refers to the attachment of two polymer chains by bridges, composed of either an element, a group, or a compound, that join carbon atoms of the polymer chains by chemical bonds. In one embodiment, cross-linking may be accomplished by use of a cross-linking agent. Cross-linking agent, as used herein, is a material used to form the bridges between the polymer chains. Cross-linking agents may include, but are not limited to, diepoxides, polyepoxides, dianhydrides, polyanhydrides, dialdehydes, polyaldehydes, diisocynates, polyisocynates, and mixtures thereof. Polyepoxides may include, but are not limited to, glycerol diglycedyl ether, neopentyl glycol diglycidyl ether, glycerol propoxylate triglycidyl ether, bisphenol A propoxylate diglycidyl ether, bisphenol A diglycidyl ether. Polyaldehydes may include, but are not limited to, glyoxal. The cross-linking agent may comprise up to 10 wt % of the fiber.

In one embodiment, the foregoing fiber may be made by the following procedure: one cellulose ester is dissolved into a suitable solvent to form a dope, and the dope is spun into a filament. In another embodiment, a cross linking agent is added to the dope, and the dope is spun into a fiber.

Suitable solvent, as used herein, refers to any solvent capable of dissolving the cellulose ester. Suitable solvents include, but are not limited to, acetone, acetone/water mixture, acetic acid, dichloromethane, dichloromethane/methanol mixture, chloroform, and mixtures thereof.

EXAMPLES

The present invention is further illustrated with regard to the following non-limiting examples. In these examples, one esterifying agent is acetic anhydride, other esterifying agents are noted. All reactions are conducted in glacial acetic acid. All reaction conditions are conventional.

Table 1 illustrates the effect of various catalysts on intrinsic viscosity (IV) and solution clarity (Haze).

Table 2 illustrates the effect of pre-treatment on IV and Haze.

Table 3 illustrates the preparation of carboxylated starch acetates.

Table 4 illustrates the mechanical properties of fibers made according to the present invention.

Table 5 illustrates the mechanical properties of fibers including an internal plasticizer.

Table 6 illustrates the mechanical properties of fibers with cross-linking.

The test procedures mentioned in the tables were determined as follows:

IV—intrinsic viscosity was measured at 30° C., using dichloromethane as a solvent in a #25 Cannon-Ubbelohde viscometer.

Haze—The solution haze is based on measurements from a BYK-Gardner Hazegard Plus instrument of a 3% w/v polymer solution in a 95 wt % acetone/5 wt % water solvent mixture. Insoluble and partially soluble materials are undesirable and contribute to solution haze.

Color—Yellowness index (b) is measured by Colorgard System 1000 Colorimeter of a 3 w/v % polymer in 91 wt % dichloromethane/9 wt % methanol mixture. A lower number indicates a better result.

GPC—Gel-Permeation Chromatography is measured with an Alltech MKIII ELSD detector, TosoHaas column using 95 wt % acetone/5 wt % water solvent mixture (PMMA is used as a standard).

Tenacity, elongation, and Tensile Factor—were based upon information obtained from an Instron model 4500. Denier/dpf was determined by a Vibromat M.

TABLE 1

| Catalyst | Amount (%) | Temperature* (° C.) | Time* (hour) | IV** (dl/g) | Haze (95/5)*** |
|---|---|---|---|---|---|
| Sulfuric acid | 0.5 | 80-85 | 1.08 | 0.23 | 98.6 |
| Methanesulfonic acid | 1.9 | 80 | 1.67 | 0.17 | 99.5 |
| Dodecylbenzene sulfonic acid | 1.9 | 80-90 | 2.17 | 0.57 | 98.0 |
| Ion exchange resin plus filtration | 15 | 80 / 105 | 1.5 / 0.6 | 0.61 | 81.1 |
| Ion exchange resin plus filtration | 15 | 80 | 4 | 0.39 | |
| Phosphoric acid | 10 | 80 | 4 | 0.83 | 60.5 |
| Sulfuric/ phosphoric acid mixture (1/3) | 0.6 | 80 | 2.2 | 0.53 | 100.0 |

*Temperature and Time are acetylation temperature and time, same as follows
**IV was measured in dichloromethane solution.
***(95/5) is the solvent mixture containing 95% of acetone and 5% of water, same as follows.

TABLE 2

| Pretreating agent | PA** amt. (%) | MA*** (%) | Temperature (° C.) | Time (hour) | Haze |
|---|---|---|---|---|---|
| No pretreatment | 10 | 0 | 80-90 | 4.0 | 60.5 |
| 100% water | 10 | 0 | 80-90 | 1.0 | 17.2 |
| No pretreatment | 10 | 20 | 80-90 | 3.4 | 27.2 |
| 100% water | 10 | 20 | 80-90 | 1.0 | 17.2 |
| 20/80 water/acid | 10 | 20 | 80-90 | 2.5 | 9.89 |
| 10/90 water/acid | 8 | 20 | 80-90 | 2.0 | 20.5 |
| 7/93 water/acid | 10 | 20 | 80-90 | 3.0 | 72.4 |

*All pretreatment time are 0.5 h
**PA is phosphoric acid as a catalyst
***MA is maleic anhydride as one of the acylating agent. Percentage added is based on dry starch, same as follows.

TABLE 3

| Carboxylated Starch acetate | cyclic anhydride description | cyclic anhydride amount (%) | Temperature (° C.) | Time (hour) | Haze (95/5) | Color (b) | GPC (min) |
|---|---|---|---|---|---|---|---|
| Starch acetate (SA only) | None | None | 85-95 | 2.5 | 29.8 | 1.87 | 7.64 |
| Starch acetate (SAM) | Maleic anhydride | 30 | 85-95 | 2.5 | 28.5 | 1.73 | 7.71 |
| Starch acetate (SAP) | Phthalic anhydride | 30 | 85-95 | 2.5 | 23.3 | 2.45 | 7.52 |
| Starch acetate (SAOS) | Octenyl succinic anhydride | 30 | 85-95 | 1.7 | 11.1 | 1.68 | 7.45 |

*All samples went through pretreatment with 85/15 acetic acid/water for 0.5 h before acetylation

TABLE 4

| Sample | cyclic anhydride description | cyclic anhydride amount (%) | Tenacity (g/dpf) | Elongation (%) | Tensile Factor* ($TE^{1/2}$) |
|---|---|---|---|---|---|
| 100% CA (Control) | None | None | 1.29 | 35.5 | 7.69 |
| 75/25 CA/SA (SA) | None | None | 0.73 | 22.3 | 3.45 |
| 75/25 CA/SA (SAMA) | Maleic anhydride | 30 | 0.84 | 31.8 | 4.74 |
| 75/25 CA/SA (SAPA) | Phthalic anhydride | 30 | 1.01 | 33.1 | 5.81 |
| 75/25 CA/SA (SAOS) | Octenyl succinic anhydride | 30 | 1.01 | 35.6 | 6.00 |

*Tensile Factor = Tenacity × $Elongation^{1/2}$

TABLE 5

| Sample | cyclic anhydride description | cyclic anhydride amount (%) | Tenacity (g/dpf) | Elongation (%) | Tensile Factor* ($TE^{1/2}$) |
|---|---|---|---|---|---|
| 100% CA (Control) | None | None | 1.29 | 35.5 | 7.69 |
| 75/25 CA/SA (SA) | None | None | 0.73 | 22.3 | 3.45 |
| 75/25 CA/SA | Octenyl succinic anhydride | 10 | 0.95 | 49.1 | 6.70 |
| 75/25 CA/SA | Octenyl succinic anhydride | 40 | 1.05 | 48.3 | 7.29 |

TABLE 6

| Sample | crosslink agent description | crosslink amount (%) | Tenacity (g/dpf) | Elongation (%) | Tensile Factor* ($TE^{1/2}$) |
|---|---|---|---|---|---|
| 100% CA (Control) | None | None | 1.29 | 35.5 | 7.69 |
| 75/25 CA/SAM | None | 0 | 0.84 | 31.8 | 4.74 |
| 75/25 CA/SA | GDE* | 0.3 | 1.01 | 44.0 | 6.70 |
| 75/25 CA/SA | GDE + heating | 0.3 | 1.05 | 40.3 | 6.67 |

*GDE is glycerol diglycidyl ether, as a crosslinking agent

The present invention may be embodied in other forms without departing from the spirit and the essential attributes thereof, and, accordingly, reference should be made to the appended claims, rather than to the foregoing specification, as indicated the scope of the invention.

We claim:

1. A method of making starch esters comprising the step of: reacting a starch with at least two anhydric esterifying agents, in an esterifying agents to starch ratio of 2.1-3.6:1.0, in the presence of a catalyst consisting of phosphoric acid.

2. The method of claim 1, wherein the starch ester is acetone soluble.

3. The method of claim 1, wherein the starch is selected from the group consisting of: corn starch, potato starch, rice starch, wheat starch, tapioca starch, arrachaca starch, buckwheat starch, banana starch, barley starch, cassava starch, kudzu starch, oca starch, sago starch, sorghum starch, sweet potato starch, taro starch, yam starch, fava bean starch, lentil starch, pea starch, and combinations thereof.

4. The method of claim 1, wherein said at least two anhydric esterifying agents are a non-cyclic organic anhydride and a cyclic organic anhydride.

5. The method of claim 4, wherein the non-cyclic organic anhydride is selected from the group consisting of: acetic anhydride, propionic anhydride, butyric anhydride, hexanoic anhydride, and mixtures thereof.

6. The method of claim 4, wherein the cyclic organic anhydride is selected from the group consisting of maleic anhydride, phthalic anhydride, succinic anhydride, hexenyl succinic anhydride, octenyl succinic anhydride, dodecenyl succinic anhydride, hexadecenyl succinic anhydride, and mixtures thereof.

7. A method of making starch esters comprising the steps of:
pre-treating a starch in a bath free of an esterifying agent, the bath comprising water, a solvent for the starch ester, and/or combinations thereof, and
reacting the pre-treated starch with an anhydric esterifying agent, in an esterifying agents to starch ratio of 2.1-3.6:1.0, in the presence of a catalyst consisting of phosphoric acid.

8. The method of claim 7, wherein the starch ester is acetone soluble.

9. The method of claim 7, wherein the starch is selected from the group consisting of: corn starch, potato starch, rice starch, wheat starch, tapioca starch, arrachaca starch, buckwheat starch, banana starch, barley starch, cassava starch, kudzu starch, oca starch, sago starch, sorghum starch, sweet potato starch, taro starch, yam starch, fava bean starch, lentil starch, pea starch, and combinations thereof.

10. The method of claim 7, wherein the anhydric esterifying agent is selected from the group consisting of: acetic anhydride, propionic anhydride, butyric anhydride, hexanoic anhydride, maleic anhydride, phthalic anhydride, succinic anhydride, hexenyl succinic anhydride, octenyl succinic anhydride, dodecenyl succinic anhydride, hexadecenyl succinic anhydride, and mixtures thereof.

11. The method of claim 1, wherein the solvent for the starch ester is being selected from the group consisting of acetic acid, formic acid, propionic acid, butyric acid, dichloromethane, chloroform, and mixtures thereof.

12. The method of claim 7 wherein the solvent for the starch ester is selected from the group consisting of acetic acid, formic acid, propionic acid, butyric acid, dichloromethane, chloroform, and mixtures thereof.

\* \* \* \* \*